United States Patent [19]
Nakamura et al.

[11] Patent Number: 6,012,898
[45] Date of Patent: Jan. 11, 2000

[54] SUBMERGED MOTOR PUMP

[75] Inventors: Teruo Nakamura; Fumio Kobayashi, both of Kanagawa-Ken, Japan; Hideharu Watanabe, Sparks, Nev.

[73] Assignee: Ebara Corporation, Tokyo, Japan

[21] Appl. No.: 09/101,894

[22] PCT Filed: Jun. 6, 1997

[86] PCT No.: PCT/US97/09291

§ 371 Date: Feb. 16, 1999

§ 102(e) Date: Feb. 16, 1999

[87] PCT Pub. No.: WO97/46806

PCT Pub. Date: Dec. 11, 1997

[30] Foreign Application Priority Data

Jun. 7, 1996 [JP] Japan ................................ 8-146280

[51] Int. Cl.[7] .................................................. F04B 17/03
[52] U.S. Cl. .......................... 415/107; 415/104; 415/111; 415/113; 415/199.2; 415/229; 417/365; 417/424.1; 384/102
[58] Field of Search .................................. 415/104, 107, 415/111, 112, 113, 199.1, 199.2, 199.3, 229, 901; 384/102; 417/365, 424.1, 424.2

[56] References Cited

U.S. PATENT DOCUMENTS 3,147,913  9/1964  Davies et al. .
4,545,741  10/1985  Tomoika et al. .
4,687,346  8/1987  Suciu .
4,708,587  11/1987  Katayama et al. .
4,892,459  1/1990  Guelich .
5,591,016  1/1997  Kubota et al. .

FOREIGN PATENT DOCUMENTS 57-163720  10/1982  Japan .

*Primary Examiner*—Christopher Verdier
*Attorney, Agent, or Firm*—Fish & Neave; Robert R. Jackson; Douglas A. Cardwell

[57] ABSTRACT

A submerged motor pump (4) has an auxiliary bearing assembly (19, 20) for supporting a rotatable main shaft (9) when the submerged motor pump is not in an operating condition or operates in a transient condition. The submerged motor pump includes a pump casing (6), at least one impeller (12), a motor (10,11), and a thrust balancing mechanism (15) for balancing thrust forces. The submerged motor pump further includes hydrostatic bearings (16, 17, 18) for supporting the main shaft at axially spaced locations by a pressurized fluid pumped by the submerged motor pump. The auxiliary bearing assembly has tapered support surfaces (FL, FU) for supporting the main shaft at the axially spaced locations.

7 Claims, 4 Drawing Sheets

SUBMERGED MOTOR PUMP

BACKGROUND OF THE INVENTION

1. Field of the Invention

The present invention relates to a submerged motor pump which comprises a motor and a pump combined with each other as a unitary assembly and has a thrust balancing mechanism, and more particularly to a submerged motor pump having an auxiliary bearing assembly for supporting a rotatable main shaft when the submerged motor pump operates in a transient condition.

2. Description of the Related Art

Hydrostatic bearings used in a submerged motor pump which produce a load capacity under the pressure of a pressurized fluid pumped by the pump support a rotatable main shaft of the pump in a noncontact state by utilizing the static pressure of a fluid in a small chamber which is normally referred to as a pocket.

A submerged motor pump uses a liquid pumped thereby as a pressurized fluid for hydrostatic bearings. When a submerged motor pump is not operating, or is in a transient condition, i.e., it is in a starting operation or a stopping operation, the pressure of the fluid discharged from the pump is not sufficiently high, and thus the hydrostatic bearings fail to achieve their sufficient performance. Therefore, the submerged motor pump normally uses ball bearings as auxiliary bearings, in addition to the hydrostatic bearings, for supporting the main shaft of the pump. The ball bearings serve to support the main shaft only when the pump is not in an operating condition or is in a transient condition. While the pump is operating in a normal condition where the pressure of the fluid discharged from the pump is sufficiently high, axial loads (i.e., axial thrusts) are balanced by a thrust balancing mechanism, and the main shaft is supported by the hydrostatic bearings. At this time, since the ball bearings do not support the main shaft, the ball bearings are arranged such that they are free from any loads from the main shaft.

The ball bearing has a cylindrical bearing surface, and a small gap is formed between the cylindrical bearing surface of the ball bearing and the outer circumferential surface of the main shaft. This gap is smaller than the gap between the hydrostatic bearing and the main shaft in order to prevent the hydrostatic bearing from contacting the main shaft when the pump is operating in the transient condition. However, the gap between the ball bearing and the main shaft cannot be made zero, but is set to an appropriate value. When the pump is operating in the transient condition, the ball bearing cannot prevent the main shaft from wobbling in the gap, i.e., cannot support the main shaft stably enough to avoid excessive vibrations and various phenomena responsible for accidents.

SUMMARY OF THE INVENTION

It is therefore an object of the present invention to provide a submerged motor pump in which a main shaft can be stably supported when the submerged motor pump is operating in a transient condition.

According to the present invention, there is provided a submerged motor pump comprising: a pump casing; at least one impeller provided in the pump casing; a motor; a main shaft which is rotated by the motor and supports the impeller; a thrust balancing mechanism for balancing thrust forces; hydrostatic bearings for supporting the main shaft at axially spaced locations by a pressurized fluid pumped by the submerged motor pump; and an auxiliary bearing assembly for supporting the main shaft when the submerged motor pump is not in an operating condition or is in a transient condition, the auxiliary bearing assembly having support surfaces for supporting the main shaft at axially spaced locations, and the support surfaces being tapered.

The auxiliary bearing assembly comprises an upper ball bearing and a lower ball bearing which support upper and lower portions, respectively, of the main shaft.

One of the support surfaces comprises a contacting surface of a first bearing sleeve mounted in the upper ball bearing and a first shaft sleeve mounted on the main shaft, and the other of the support surfaces comprises a contacting surface of a second bearing sleeve mounted in the lower ball bearing and a second shaft sleeve mounted on the main shaft.

One of the support surfaces is defined by a tapered surface that is progressively reduced in diameter in an upward direction, and the other of the support surfaces is defined by a tapered surface that is progressively reduced in diameter in a downward direction.

When the submerged motor pump is in a transient condition, the main shaft is lowered by its gravity, and the tapered surfaces of the lower bearing sleeve and the corresponding shaft sleeve fit against each other, and the main shaft is supported concentrically by the lower ball bearing without any significant gap therebetween. With the main shaft being lowered, the upper ball bearing and the upper bearing sleeve are lowered under the bias of an urging member. The tapered surfaces of the upper bearing sleeve and the corresponding shaft sleeve fit against each other, and the main shaft is supported concentrically by the upper ball bearing without any significant gap therebetween.

When the submerged motor pump operates in a normal condition where the pressure of a discharged fluid is sufficiently high, a sufficient load capacity is obtained for the hydrostatic bearings, which support the main shaft in a noncontact state. The thrust balancing mechanism is actuated to lift the main shaft, and the tapered surfaces of the lower bearing sleeve and the corresponding shaft sleeve are disengaged from each other, so that the lower bearing sleeve and the corresponding shaft sleeve are held out of contact with each other. The upper ball bearing is lifted by pressing means against the bias of the urging member, and the tapered surfaces of the upper bearing sleeve and the corresponding shaft sleeve are disengaged from each other, so that the upper bearing sleeve and the corresponding shaft sleeve are held out of contact with each other.

The above and other objects, features, and advantages of the present invention will become apparent from the following description when taken in conjunction with the accompanying drawings which illustrate a preferred embodiment of the present invention by way of example.

DETAILED DESCRIPTION OF THE PREFERRED EMBODIMENT

A submerged motor pump according to an embodiment of the present invention will be described below with reference to FIGS. 1 through 4.

Figure 1:
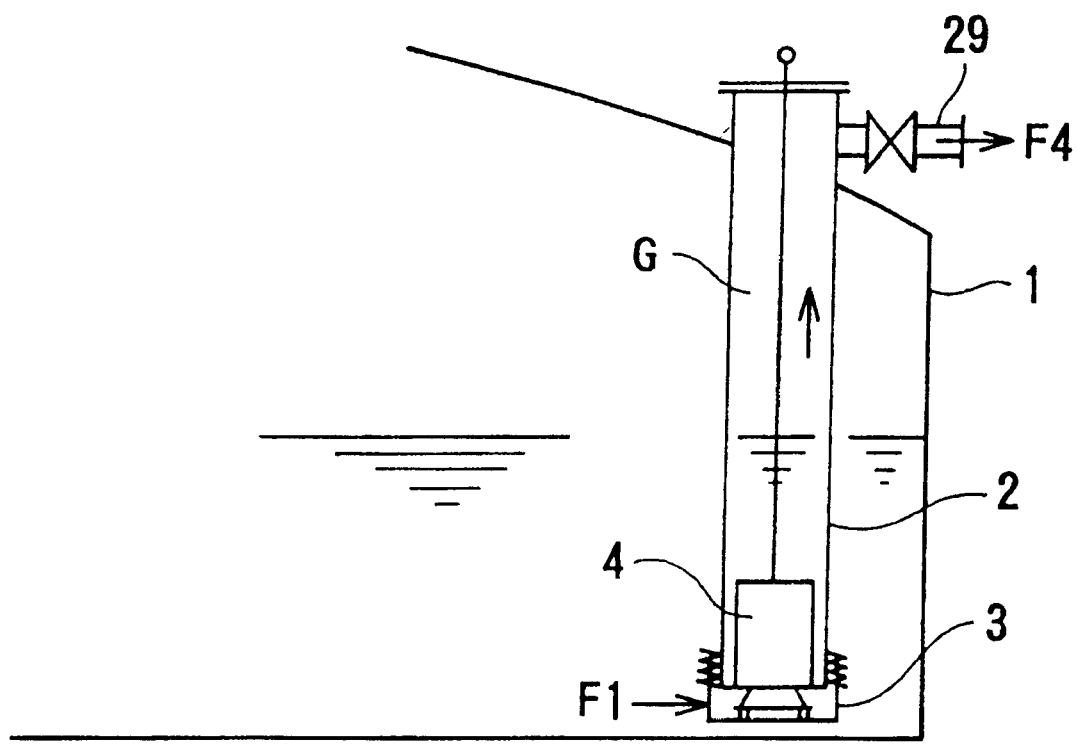
FIG. 1 is a schematic vertical cross-sectional view of a reservoir tank in which a submerged motor pump according to an embodiment of the present invention is installed.
Figure 2:
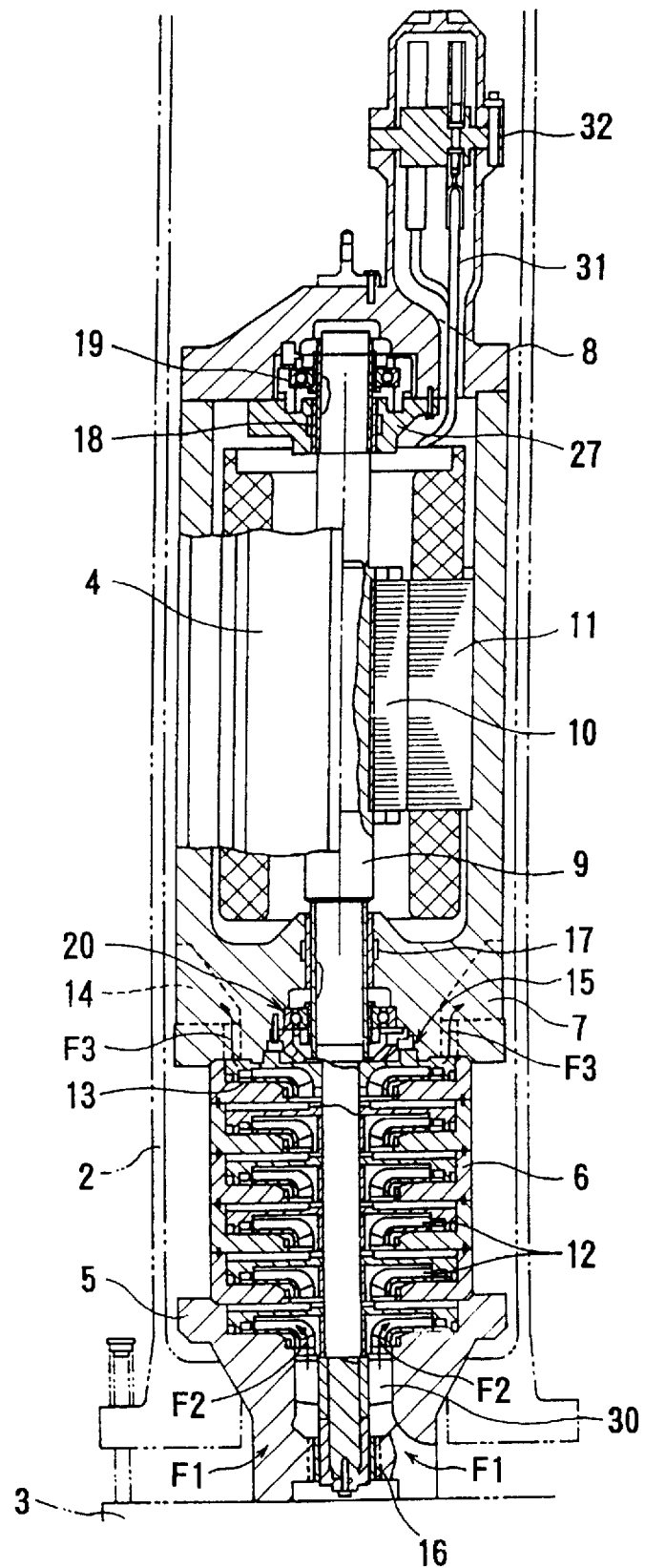
FIG. 2 is an enlarged vertical cross-sectional view of the submerged motor pump shown in FIG. 1.

As shown in FIG. 1, a submerged motor pump, generally denoted by 4 is positioned in a lower position of a barrel 2 vertically installed in a reservoir tank 1. A suction valve 3 is provided below the submerged motor pump 4. As shown in FIG. 2, the submerged motor pump 4 has a suction casing 5, multistage pump casings 6, and a plurality of impellers 12 and a final-stage impeller 13 provided in the respective pump casings 6.

The impellers 12 and 13 are fixed to a main shaft 9. A motor rotor 10 is rotatably provided in a motor housing 7 and fixedly supported on the main shaft 9. An inducer 30 is fixed to the lower portion of the main shaft 9. A motor stator 11 is fixedly mounted in the motor housing 7 in surrounding relation to the motor rotor 10.

As shown in FIGS, 1 and 2, when the submerged motor pump 4 operates, a liquid G such as a liquefied gas to be pumped flows from the opening of the suction valve 3 into the suction casing 5 of the pump 4 as indicated by the arrows F1. Then, as indicated by the arrows F2, the liquid G flows through the inducer 30 mounted on the main shaft 9, and is pressurized successively by the impellers 12 mounted on the main shaft 9. The liquid G reaches the uppermost final-stage impeller 13, and is discharged from the impeller 13 into the barrel 2 through a discharge port 14 formed in the motor housing 7 as indicated by the arrows F3. Thereafter, the liquid G flows upwardly in the barrel 2, and is discharged from a discharge nozzle 29 connected to an upper end of the barrel 2 to the outside of the reservoir tank 1 as indicated by the arrow F4.

The submerged motor pump 4 has a thrust balancing mechanism 15 which serves to balance thrust forces acting on the main shaft 9. The submerged motor pump 4 also includes a lower hydrostatic bearing 16 by which the lower end of the main shaft 9 is rotatably supported in the suction casing 5, an intermediate hydrostatic bearing 17 by which an intermediate portion of the main shaft 9 is rotatably supported in the motor housing 7, and an upper hydrostatic bearing 18 by which an upper end of the main shaft 9 is rotatably supported in the motor housing 7. The pressurized liquid discharged from an intermediate one of the impellers 12 is introduced into these hydrostatic bearings 16, 17 and 18. The submerged motor pump 4 further includes an auxiliary bearing assembly which comprises an upper bail bearing 19 by which the upper end of the main shaft 9 is rotatably supported in an upper casing 8 mounted on an upper end of the motor housing 7, and a lower ball bearing 20 by which the intermediate portion of the main shaft 9, immediately below the intermediate hydrostatic bearing 17, is rotatably supported in the motor housing 7. The reference numeral 27 represents an upper hydrostatic bearing retainer.

The motor stator 11 includes windings electrically connected to a power supply through motor leads 31. The motor leads 31 are electrically connected to terminals supported on a terminal base 32. The terminal base 32 is positioned above and supported by the upper casing 8.

Figure 3:
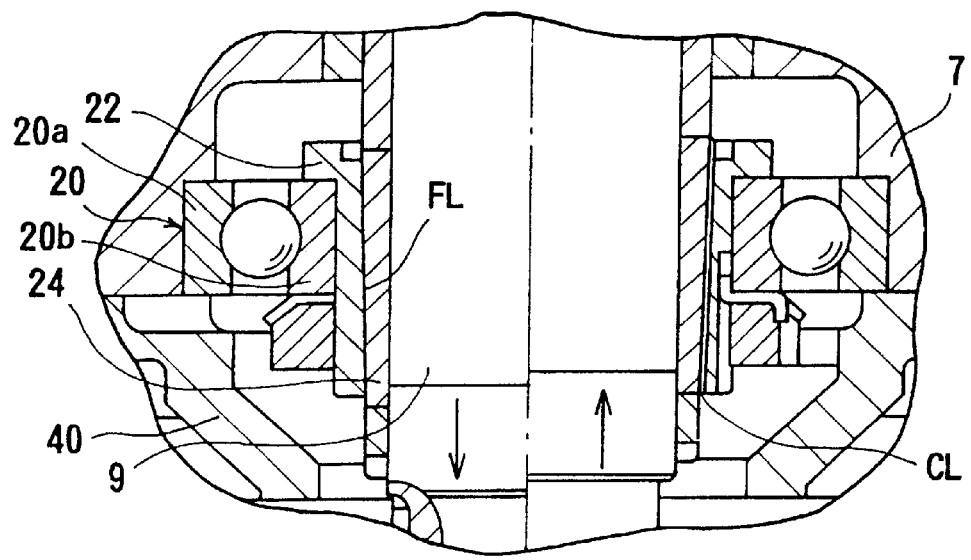
FIG. 3 is an enlarged fragmentary vertical cross-sectional view of a lower ball bearing and surrounding parts thereof in the submerged motor pump, and shows the position of the parts in the left-hand side when the submerged motor pump is operating in a transient condition and the position of the parts in the right-hand side when the submerged motor pump is operating in a normal condition.

FIG. 3 shows the position of the parts of the lower ball bearing 20 in the left-hand side when the submerged motor pump 4 is operating in a transient condition and the position of the parts thereof in the right-hand side when the submerged motor pump 4 is operating in a normal condition.

As shown in FIG. 3, the lower ball bearing 20 has an outer race 20a secured to the motor housing 7 and an inner race 20b in which a lower bearing sleeve 22 is mounted. The lower bearing sleeve 22 has a tapered inner surface that is progressively reduced in diameter in the downward direction. A lower shaft sleeve 24 is fixedly mounted on the main shaft 9, and has a tapered outer surface that is engageable with the tapered inner surface of the lower bearing sleeve 22. The lower bearing sleeve 22 and the lower shaft sleeve 24 jointly constitute a part of the auxiliary bearing assembly and jointly provide a lower support surface FL at their engaging surfaces.

Figure 4:
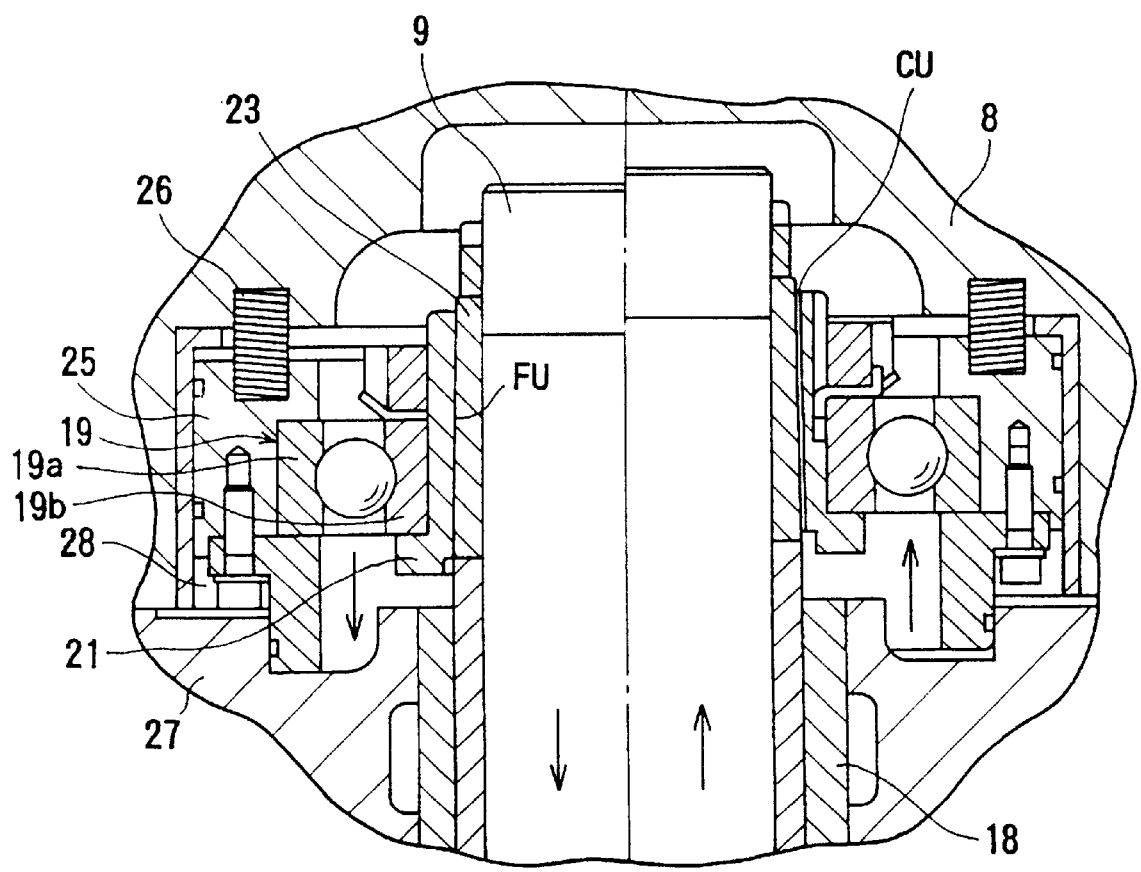
FIG. 4 is an enlarged fragmentary vertical cross-sectional view of an upper ball bearing and surrounding parts thereof in the submerged motor pump, and shows the position of the parts in the left-hand side when the submerged motor pump is operating in the transient condition and the position of the parts in the right-hand side when the submerged motor pump is operating in the normal condition.

FIG. 4 shows the position of the parts of the upper ball bearing 19 in the left-hand side when the submerged motor pump 4 is operating in the transient condition and the position of the parts thereof in the right-hand side when the submerged motor pump 4 is operating in the normal condition.

As shown in FIG. 4, the upper ball bearing 19 has an outer race 19a secured to a bearing housing 25 which is vertically movably housed in the upper casing 8 and an inner race 19b in which an upper bearing sleeve 21 is mounted. The upper bearing sleeve 21 has a tapered inner surface that is progressively reduced in diameter in the upward direction. An upper shaft sleeve 23 is fixedly mounted on the main shaft 9, and has a tapered outer surface that is engageable with the tapered inner surface of the upper bearing sleeve 21. The upper bearing sleeve 21 and the upper shaft sleeve 23 jointly constitute a part of the auxiliary bearing assembly and jointly provide an upper support surface FU at their engaging surfaces.

As shown in FIG. 4, compression coil springs 26 are interposed between the bearing housing 25 and the upper casing 8. The compression coil springs 26 serve to urge the upper ball bearing 19 downwardly through the bearing housing 25. The bearing housing 25 and the upper hydrostatic bearing retainer 27 define a small chamber 28 therebetween which communicates with a high-pressure liquid region in the submerged motor pump 4 when the submerged motor pump 4 operates in the normal condition.

The small chamber 28 serving as a pocket and the high-pressure liquid supplied from the high pressure liquid region to the pocket jointly serve as pressing means for pressing the bearing housing 25 as described later on.

Figures 5A, 5B:
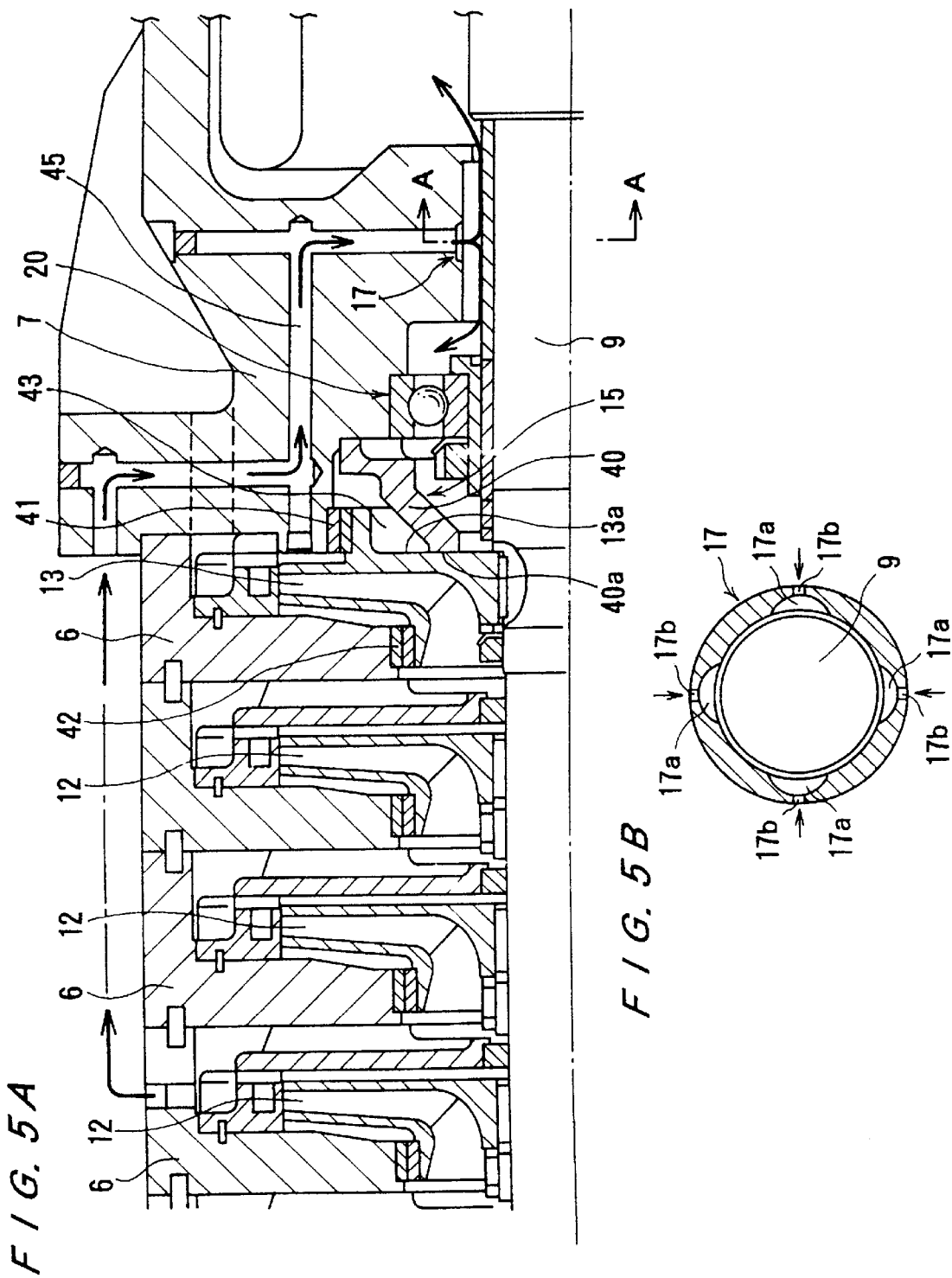
FIG. 5A is an enlarged cross-sectional view of the submerged motor pump shown in FIG. 1.
FIG. 5B is a cross-sectional view taken along line A—A of FIG. 5A.

FIGS. 5A and 5B shows the thrust balancing mechanism 15 and the hydrostatic bearing 17.

As shown in FIG. 5A, the thrust balancing mechanism 15 is provided adjacent to the final-stage impeller 13. The thrust balancing mechanism 15 comprises a stationary plate 40 fixed to the motor housing 7, a back face 13a of the impeller 13 which faces the end face 40a of the stationary plate 40, an upper wearing ring 41 fixed to the motor housing 7, a lower wearing ring 42 fixed to the pump casing 6, and an upper chamber 43 defined by the back face 13a, the stationary plate 40 and the motor housing 7. The upper wearing ring 41 is larger in diameter than the lower wearing ring 42, thus producing a thrust upward. Due to this upward force (or thrust), the main shaft 9 and all of its rotating parts move upward by a predetermined distance. As the impeller 13 moves upward, the back face 13a of the impeller 13 reduces the clearance between it and the end face 40a of the stationary plate 40, thus restricting the wearing ring leakage flow and causing pressure in the upper chamber 43 to increase. Due to increased pressure in the upper chamber 43, the thrust is reversed and now acts in a downward direction. This causes the rotating assembly to move downward, thereby opening the passage between the end face 40a of the stationary plate 40 and the back face 13a of the impeller 13, allowing the pressure in the upper chamber 43 to decrease. The opening between the end face 40a of the stationary plate 40 and the back face 13a of the impeller 13 then adjusts automatically to produce pressure in the upper chamber 43 sufficient to offset the upward thrust. Continuous self-adjustment by the thrust balancing mechanism 15 allows the pump to operate essentially at "ZERO" thrust load over the entire usable capacity range for pumping.

As shown in FIGS. 5A and 5B, the hydrostatic bearing 17 comprises a plurality of pockets 17a and orifices 17b for supplying a pressurized liquid to the pockets 17a. The pressurized liquid discharged from one of the impellers 12 is introduced into the pockets 17a through a passage 45 formed in the motor housing 7 and the orifices 17b. Thus, the main shaft 9 is supported by the hydrostatic pressure of the liquid in the pockets 17a. The hydrostatic bearings 16 and 18 have the same structure as the hydrostatic bearing 17.

Operation of the submerged motor pump 4 will be described below.

When the submerged motor pump 4 is not operating, the main shaft 9 is lowered by its gravity as shown in the left-hand side of FIG. 3, and the tapered surfaces of the lower bearing sleeve 22 and the lower shaft sleeve 24 fit against each other, thus providing the lower support surface FL. Therefore, the main shaft 9 is supported concentrically by the lower ball bearing 20 without any significant gap therebetween.

Further, as shown in the left-hand side of FIG. 4, when the main shaft 9 is lowered, the upper ball bearing 19 follows the downward movement of the main shaft 9 with the bearing housing 25 by urging force of the compression coil spring 26. Thus, the tapered surfaces of the upper bearing sleeve 21 and the upper shaft sleeve 23 fit against each other, thus providing the upper support surface FU. Therefore, the main shaft 9 is supported concentrically by the upper ball bearing 19 without any significant gap therebetween.

The submerged motor pump 4 starts operating from the above inoperative condition. In order for the main shaft 9 to be supported by the hydrostatic bearings 16, 17 and 18 and to be lifted by the thrust balancing mechanism 15, the submerged motor pump 4 has to develop a discharge pressure high enough to operate them normally. In other words, the barrel 2 is filled with the liquid G, and a hydraulic resistance at the discharge side is sufficiently large enough to meet the above requirements. Until the pressure of liquid discharged from the pump 4 reaches a certain value after starting operation of the pump 4, the main shaft 9 rotates under the same conditions as when the submerged motor pump 4 is not in operation. Even in such a transient condition, the main shaft 9 is stably supported concentrically by the ball bearings 19 and 20 without any significant gap between the main shaft 9, and the ball bearings 19 and 20. Consequently, the main shaft 9 is prevented from wobbling with respect to the ball bearings, and hence from vibrating or suffering various phenomena responsible for accidents.

After the barrel 2 is filled with the liquid G, and while the submerged motor pump 4 is operating in a normal condition, the pressure of the liquid G discharged from the submerged motor pump 4 is sufficiently high, thus providing a sufficient load capacity for the hydrostatic bearings 16, 17 and 18. Therefore, the hydrostatic bearings 16, 17 and 18 support the main shaft 9 in a noncontact state, and the main shaft 9 is no longer supported radially by the ball bearings 19 and 20. Since axial thrust forces on the main shaft 9 are balanced by the thrust balancing mechanism 15, the ball bearings 19 and 20 are not required to axially support the main shaft 9.

When the thrust balancing mechanism 15 is actuated, the main shaft 9 is lifted, and thus the lower shaft sleeve 24 is lifted axially to bring its tapered outer surface out of engagement with the tapered inner surface of the lower bearing sleeve 22 as shown in the right-hand side of FIG. 3. The lower shaft sleeve 24 and the lower bearing sleeve 22 are now held out of contact with each other with a gap CL created therebetween. As no load is applied to the lower ball bearing 20, the lower ball bearing 20 is not rotated.

With the main shaft 9 being thus lifted, the upper shaft sleeve 23 and the upper bearing sleeve 21 are also elevated axially, and the upper ball bearing 19 is also pushed upwardly. At this time, under the pressure of the liquid G introduced into the small chamber 28, the bearing housing 25 is lifted by a distance greater than the lifting distance of the main shaft 9, against the bias of the compression coil springs 26. As a result, the tapered surfaces of the upper bearing sleeve 21 and the upper shaft sleeve 23 are disengaged from each other, and the upper bearing sleeve 21 and the upper shaft sleeve 23 are now held out of contact with each other with a gap CU created therebetween. The upper ball bearing 19 is not rotated as no load is imposed thereon.

Because the ball bearings 19 and 20 serving as the auxiliary bearing assembly are isolated from the rotating parts while the submerged motor pump 4 is operating in the normal condition, the submerged motor pump 4 has a relatively long service life.

In the illustrated embodiment, the submerged motor pump 4 is shown as a multistage motor pump installed in the barrel 2 in the reservoir tank 1. However, the principles of the present invention are also applicable to a multistage or single-stage motor pump installed in a suction pot or the like which is not equipped with a suction valve.

As described above, the present invention offers the following advantages:

The main shaft can be stably supported concentrically at the upper and lower parts thereof by the auxiliary bearing assembly including the ball bearings even in the transient condition without any significant gap between the main shaft and the ball bearings. Thus, the main shaft is prevented from wobbling, and hence from vibrating or suffering various phenomena responsible for accidents.

Further, the ball bearings as the auxiliary bearing assembly are isolated from the rotation parts, and hence the submerged motor pump has a relatively long service life.

Although a certain preferred embodiment of the present invention has been shown and described in detail, it should be understood that various changes and modifications may be made therein without departing from the scope of the appended claims.

What is claim is:

1. A submerged motor pump comprising:

a pump casing;

at least one impeller provided in said pump casing;

a motor;

a main shaft which is rotated by said motor and supports said impeller;

a thrust balancing mechanism for balancing thrust forces;

hydrostatic bearings for supporting said main shaft at axially spaced locations by a pressurized fluid pumped by said submerged motor pump; and an auxiliary bearing assembly for supporting said main shaft when the submerged motor pump is not in a normal operating condition or is in a transient condition, said auxiliary bearing assembly having support surfaces for supporting said main shaft at axially spaced locations, and each of said support surfaces comprising tapered surfaces which fit against each other when the submerged motor pump is not in said normal operating condition or is in said transient condition, and are held out of contact with each other when the submerged motor pump is in said normal operating condition.

2. A submerged motor pump according to claim 1, wherein said auxiliary bearing assembly comprises an upper ball bearing and a lower ball bearing which support upper and lower portions, respectively, of said main shaft.

3. A submerged motor pump comprising:

a pump casing;

at least one impeller provided in said pump casing;

a motor;

a main shaft which is rotated by said motor and supports said impeller;

a thrust balancing mechanism for balancing thrust forces;

hydrostatic bearings for supporting said main shaft at axially spaced locations by a pressurized fluid pumped by said submerged motor pump; and an auxiliary bearing assembly for supporting said main shaft when the submersed motor pump is not in an operating condition or is in a transient condition, said auxiliary bearing assembly having support surfaces for supporting said main shaft at axially spaced locations, and said support surfaces being tapered;

wherein said auxiliary bearing assembly comprises an upper ball bearing and a lower ball bearing which support upper and lower portions, respectively, of said main shaft; and wherein a first one of said support surfaces comprises a contacting surface of a first bearing sleeve mounted in said upper ball bearing and a first shaft sleeve mounted on said main shaft, and a second one of said support surfaces comprises a contacting surface of a second bearing sleeve mounted in said lower ball bearing and a second shaft sleeve mounted on said main shaft.

4. A submerged motor pump according to claim 3, wherein said first one of said support surfaces is defined by a tapered surface that is progressively reduced in diameter in an upward direction, and said second one of said support surfaces is defined by a tapered surface that is progressively reduced in diameter in a downward direction.

5. A submerged motor pump according to claim 4, further comprising:

an urging member for urging said upper ball bearing downwardly; and pressing means for pressing said upper ball bearing upwardly against urging force of said urging member.

6. A submerged motor pump according to claim 5, wherein said urging member comprising a coil spring.

7. A submerged motor pump according to claim 5, wherein said pressing means comprises a pocket and a pressurized liquid supplied to said pocket.

* * * * *